(12) United States Patent
Touahri et al.

(10) Patent No.: US 12,174,066 B2
(45) Date of Patent: Dec. 24, 2024

(54) REDUCING POLARIZATION DEPENDENT LOSS (PDL) IN A GRATING-BASED OPTICAL SPECTRUM ANALYZER (OSA)

(71) Applicant: VIAVI SOLUTIONS INC., Chandler, AZ (US)

(72) Inventors: Driss Touahri, Nepean (CA); Christopher Russell Wagner, Kanata (CA); Joshua Benjamin Julius Philipson, Ottawa (CA)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 18/486,355

(22) Filed: Oct. 13, 2023

(65) Prior Publication Data

US 2024/0110831 A1    Apr. 4, 2024

Related U.S. Application Data

(63) Continuation of application No. 17/334,132, filed on May 28, 2021, now Pat. No. 11,828,648.

(51) Int. Cl.
| | | |
|---|---|---|
| *G01J 3/02* | (2006.01) | |
| *G01J 3/14* | (2006.01) | |
| *G01J 3/18* | (2006.01) | |
| *G01J 3/447* | (2006.01) | |

(52) U.S. Cl.
CPC .............. *G01J 3/0224* (2013.01); *G01J 3/14* (2013.01); *G01J 3/18* (2013.01); *G01J 3/447* (2013.01)

(58) Field of Classification Search
CPC .. G01J 3/0224; G01J 3/447; G01J 3/14; G01J 3/18
See application file for complete search history.

(56) References Cited

U.S. PATENT DOCUMENTS

| | | | | |
|---|---|---|---|---|
| 5,886,785 | A * | 3/1999 | Lefevre | G01J 3/18 356/334 |
| 5,923,472 | A | 7/1999 | Bergmann | |
| 6,545,800 | B1 * | 4/2003 | Wilson | H04B 10/077 359/337 |
| 6,714,699 | B1 * | 3/2004 | Cao | G02B 6/29358 385/17 |
| 2002/0126385 | A1 | 9/2002 | Asami et al. | |
| 2005/0073679 | A1 * | 4/2005 | He | G01J 3/02 356/328 |
| 2007/0297807 | A1 | 12/2007 | Chen et al. | |

(Continued)

*Primary Examiner* — Violeta A Prieto
(74) *Attorney, Agent, or Firm* — Mannava & Kang, P.C.

(57) ABSTRACT

A system for a high resolution optical spectrum analyzer (OSA) using various optical configurations to reduce polarization dependent loss (PDL) is disclosed. The system may include a birefringent element to receive an input optical beam. The birefringent element may then split the optical beam into at least two exit beams. The system may also include an optical configuration comprising at least one optical element. The optical configuration may receive the at least two exit beams from the birefringent element and transform at least one of the two exit beams using the at least one optical element to provide two parallel beams with parallel polarizations. The optical configuration may then output the two parallel beams with parallel polarizations to a downstream optical element, such as a diffraction grating, or other optical element.

20 Claims, 6 Drawing Sheets

(56) References Cited

U.S. PATENT DOCUMENTS

| | | | | |
|---|---|---|---|---|
| 2012/0268745 A1* | 10/2012 | Kudenov | .............. | G01J 3/0208 |
| | | | | 356/453 |
| 2015/0300876 A1* | 10/2015 | Acher | .................... | G01J 3/021 |
| | | | | 356/327 |
| 2016/0195433 A1* | 7/2016 | Kaneko | ................. | G01J 3/0208 |
| | | | | 359/494.01 |
| 2020/0124476 A1* | 4/2020 | Mercuro | .............. | G01J 3/0208 |

\* cited by examiner

```
┌─────────────────────────────────────────────────────┐
│   Split an input optical beam into two exit beams   │
│                         401                         │
└─────────────────────────────────────────────────────┘
                           │
                           ▼
┌─────────────────────────────────────────────────────┐
│ Transform the two exit beams from the birefringent  │
│ element into two parallel beams with parallel       │
│ polarizations                                       │
│                         402                         │
└─────────────────────────────────────────────────────┘
                           │
                           ▼
┌─────────────────────────────────────────────────────┐
│ Output the two parallel beams with parallel         │
│ polarizations to a downstream optical element       │
│                         403                         │
└─────────────────────────────────────────────────────┘
```

FIG. 4

REDUCING POLARIZATION DEPENDENT LOSS (PDL) IN A GRATING-BASED OPTICAL SPECTRUM ANALYZER (OSA)

PRIORITY

This patent application is a Continuation under 35 U.S.C. § 120 of co-pending U.S. patent application Ser. No. 17/334,132, filed on May 28, 2021, the disclosure of which is hereby incorporated by reference in its entirety).

TECHNICAL FIELD

This patent application is directed to optical measurement instrumentation for telecommunication networks, and more specifically, to reducing polarization dependent loss (PDL) in a grating-based optical spectrum analyzer (OSA).

BACKGROUND

Optical measurement instrumentation, such as optical spectrometers or optical spectrum analyzers (OSAs), play an important role in modern optical science. Optical spectrum analyzers (OSAs), in particular, are vital in fiber-optics and optical communication technologies. From research and development (R&D) applications to manufacturing, optical spectrum analyzers (OSAs) and other similar equipment have become essential to build and characterize a variety of fiber-optics products, such as broadband sources, optical sources, and wavelength division multiplexed (WDM) systems.

BRIEF DESCRIPTION OF DRAWINGS

Features of the present disclosure are illustrated by way of example and not limited in the following Figure(s), in which like numerals indicate like elements, in which.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

There are many types of optical spectrum analyzers (OSAs), such as Fabry-Perot-based, interferometer-based, and swept coherent heterodyne optical spectrum analyzers (OSAs). However, one of the most common optical spectrum analyzers (OSAs) for fiber-optics applications include diffraction grating-based optical spectrum analyzers (OSAs). These types of systems may also be commonly referred to as monochromator-based optical spectrum analyzers (OSAs), and may thus be referred to interchangeably as a grating-based optical spectrum analyzers (OSAs) throughout.

In a monochromator-based optical spectrum analyzer (OSA), for example, a broadband light from a bright and small light source may strike a diffraction grating. When this happens, a thin space between every two adjacent lines of the diffraction grating may become an independent "source," which may then diffract light off into a range of wavelet angles. For each wavelength and each specific angle, the diffracted wavelets may be generated at exactly one wavelength out of phase with one another, and may therefore add together constructively. In other words, light with a given wavelength may leave the diffraction grating at a specific angle. Also, the wider an illuminated portion of the diffraction grating, the higher the number of diffracted wavelets there may be, and therefore the narrower the diffracted beam pattern may become. This may enable a spectral resolution of the monochromator-based optical spectrum analyzer (OSA) to be proportional to the size of the illuminated portion of the diffraction grating.

Some grating-based optical spectrum analyzers (OSAs) include use of a double-pass (or dual-pass, two-pass, or 2-pass) monochromator concept, which may incorporate an additional optical element, such as a retroreflective element or other optical element. A technical issue associated with a double-pass monochromator based optical spectrum analyzer (OSA) may be the limited ability to generate higher resolutions. In order to achieve a higher optical resolution, a double-pass monochromator-based optical spectrum analyzer (OSA), for instance, may require large, bulky, and/or expensive optics to be added on top of or to replace the already-existing optical elements. And even if a higher optical resolution could be achieved with these additions or replacements, the increased resolution remains limited to only a few tens of picometers (pm).

For example, in order to achieve a 10-picometer resolution in a double-pass monochromator based optical spectrum analyzer (OSA), a minimum 120-millimeter long diffraction grating may be required. Such a large diffraction grating may present several dimensional challenges. First, a 120-millimeter long diffraction grating may be difficult to manufacture with precision or ease. A grating of this length (or other enlarged dimension) may be prone to greater manufacturing error or other irregularities. Second, a grating of this type may be extremely sensitive and more susceptible to various environmental changes, making it less functional or reliable in any optical spectrum analyzer (OSA).

Another challenge of a double-pass monochromator based optical spectrum analyzer (OSA) may involve stray light and its adverse effects. Stray light may have a variety of origins. Its presence may be caused by a wide variety of design and manufacturing factors. The level of stray light due to the dispersed radiation inside a monochromator or spectrograph may be affected by the design of an instrument, its baffles, its interior finish, and/or other characteristics. In a double-pass monochromator based optical spectrum analyzer (OSA), for example, stray light may generally be attributed to what is commonly referred to as a Littrow condition. Because a double-pass monochromator based optical spectrum analyzer (OSA) design may use a mirror or a 90-degree prism reflector in a particular set configuration, Littrow stray light may always exist and may unfavorably find its way to an output or exit slit of the optical spectrum analyzer (OSA). Littrow stray light may cause a strong spurious peak that appears at a wavelength between 120 nm and 200 nm below the actual signal wavelength. In order to direct such stray light away from the output or exit slit, use of complicated optical elements may typically be required. Again, these elements may be expensive, difficult to manufacture, and/or hard to incorporate in an optical spectrum analyzer (OSA) without altering its compact design framework.

Figure 1:
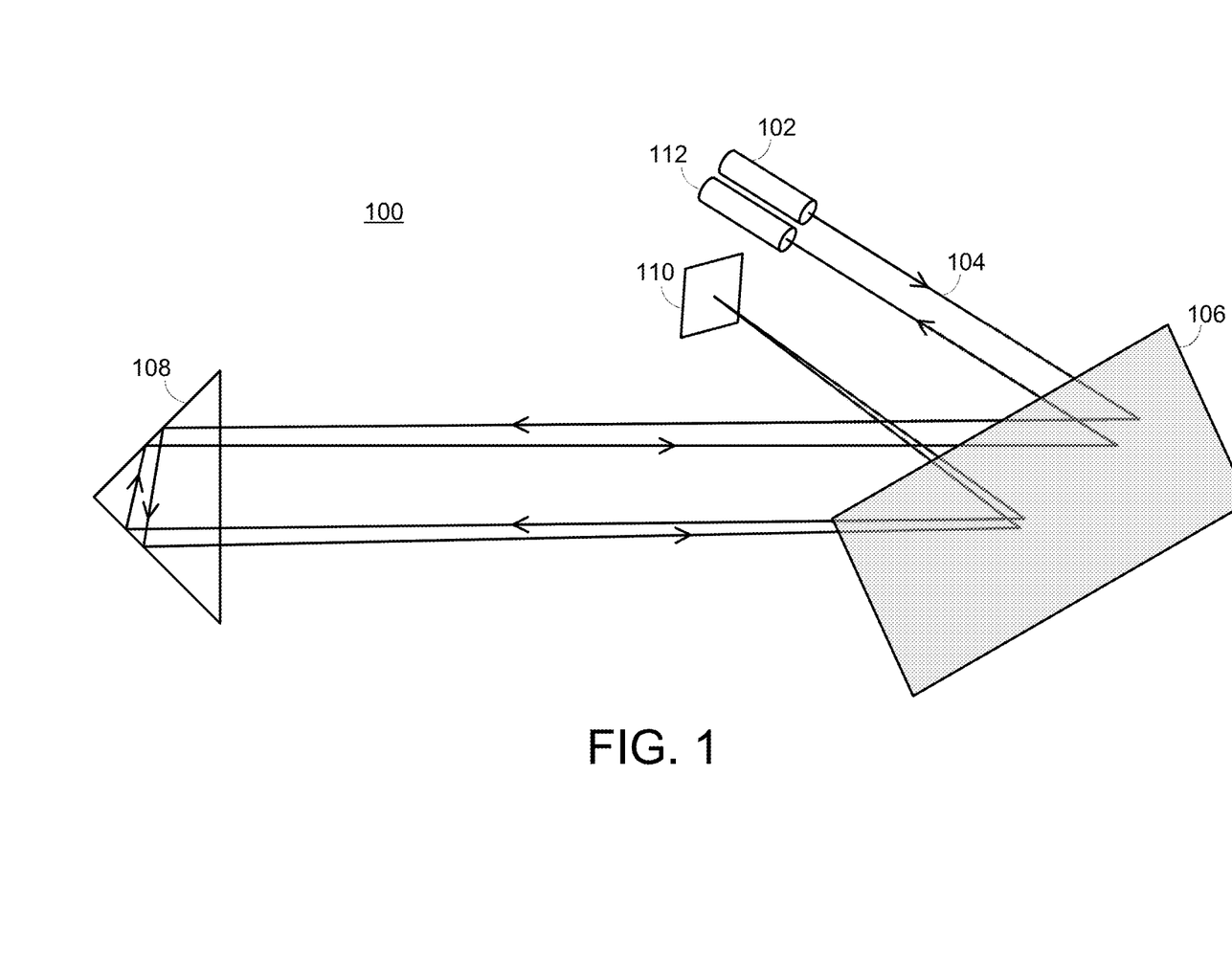
FIG. 1 illustrates a system for providing high resolution optical measurements, according to an example.

FIG. 1 illustrates a system 100 for providing higher resolution optical measurements, according to an example. In some examples, the system 100 may depict a multi-pass optical spectrum analyzer (OSA). As shown, the system 100 may be a four-pass (4-pass or quad-pass) monochromator-based optical spectrum analyzer (OSA). The system 100 may include at least an input or entrance slit 102, an optical beam 104, a grating element 106, a retroreflective element 108, a mirror element 110, and an output or exit slit 112.

It should be appreciated that one or more additional optical elements may also be provided. For example, a light source (not shown) may be provided upstream of the input or entrance slit 102 to generate a broadband beam, light, or optical signal. A light detector (not shown) may also be provided downstream of the output or exit slit 112 to collect and measure the optical beam 104. Other optical elements may also be provided. For instance, one or more collimators or lenses may be provided between the input slit 102/output or exit slit 112 and the grating element 106 to collimate or focus the optical beam 104 as needed. For simplicity, the components and elements shown in system 100 may be helpful to illustrate the multi-pass configuration and design to achieve a high resolution optical measurements.

The input or entrance slit 102 and output or exit slit 112 may enable or allow the optical beam 104 to pass through. In some examples, the input or entrance slit 102 and output or exit slit 112 may be positioned by 1 millimeter (mm) or less apart. Other distances, dimensions, or variations may also be provided to obtain the desired optical measurement. It should be appreciated that the input or entrance slit 102 or output or exit slit 112 may be physical apertures, optical fibers, and/or other mechanisms to communicatively transmit or receive optical beams.

In some examples, the grating element 106 may be a diffraction grating. As such, the diffraction grating may be an optical component with a periodic structure that splits or diffracts light into separate beams that may also travel in different directions. In some examples, the diffraction grating may be a ruled, holographic, or other similar diffraction grating. The grating element 106 may also be configured, among other things, with various properties that include transparency (transmission amplitude diffraction grating), reflectance (reflection amplitude diffraction grating), refractive index or optical path length (phase diffraction grating), and/or direction of optical axis (optical axis diffraction grating). The grating element 106 may also be made from a variety of materials. This may include any number of isotropic materials, such as, but not limited to, SCHOTT N-BK7, fused silica, borosilicate, and/or any family of equivalents, e.g., from other glass catalogs, etc. In some examples, the grating element 106 to be used in system 100 may be selected based on any number of factors to optimize the resolution of the optical spectrum analyzer (OSA). This may include factors, such as grating size, efficiency, incidence angle, blaze wavelength, wavelength range, stray light, resolving power, etc.

The retroreflective element 108 may include any number of retroreflective element configurations to provide retroreflection or other similar function. In some examples, the retroreflective element 108 may be at least one of a prism reflector, a flat mirror, a lens, or some combination thereof. In some examples, the mirror may be a convex mirror and the lens may be a focusing lens. It should be appreciated that other retroreflective elements or configurations, or combinations of such configurations, may also be provided.

The mirror element 110 may be a flat mirror or other reflective element. These may include, but not limited to, prisms, mirrors, lenses, reflectors, and/or any combination thereof. Other various optical or reflective elements may also be provided.

As shown in system 100 of FIG. 1, the optical beam 104 may travel from the input or entrance slit 102 to the grating element 106, where it is diffracted to the retroreflective element 108, where it is retroreflected back to the grating element 106 again, and then diffracted to the mirror element 110, at which point the optical beam 104 is reflected back to the grating element 106 and diffracted to the retroreflective element 108, then retroreflected again to the grating element 106, where the optical beam 104 is again diffracted and directed to the output or exit slit 112 for optical measurement (e.g., at a detector). In this way, the optical beam 104 passes through the grating element 106 four (4) times, the retroreflective element 108 twice, and the mirror element 110 once. Because the optical beam 104, in this example, passes through the same grating element 106 four times between the input or entrance slit 102 and the output or exit slit 112, the multi-pass monochromator-based optical spectrum analyzer (OSA) of system 100 may be referred to as a four-pass (4-pass or quad-pass) monochromator-based optical spectrum analyzer (OSA) that is able to achieve twice the resolution of a two-pass (2-pass or dual-pass) monochromator-based optical spectrum analyzer (OSA). And all this may be accomplished without adding or replacing optical components with larger, bulkier, or more expensive ones or significantly altering the basic design of existing systems.

The system 100 may also be equipped to manage and control stray light. As described above, in a double-pass monochromator based optical spectrum analyzer (OSA), Littrow stray light may always exist and find its way to an output of exit slit. This may be exacerbated by the use of a 90-degree prism reflector, for example, in a double-pass monochromator based design. As a result, Littrow stray light may cause a strong spurious peak that appears at a wavelength between 120 nm and 200 nm below the actual signal wavelength.

After an input light beam that originates from a light source strikes the grating element 106, the optical beam 104 may be dispersed in a plane of incidence that is, for example, perpendicular to the grating lines. For a given position of the retroreflective element 108, only one wavelength, called Lambda signal or $\lambda_s$, may trace its way back to the grating element 106. In a double-pass monochromator based optical spectrum analyzer (OSA), this lone wavelength may then be coupled back to the output or exit slit 112. Other beams with different wavelengths, however, may be diffracted at different angles, and therefore may not be normal to the retroreflective element 108. As a result, these other wavelengths may be retroreflected back towards the grating 106 at different incidence angles.

It should be appreciated that the relationship between a grating spacing and angles of the incident and diffracted beams of light may be explained by a so-called grating equation. According to the Huygens-Fresnel principle, each point on the wavefront of a propagating wave may be considered to act as a point source, and the wavefront at any subsequent point may be found by adding together the contributions from each of these individual point sources. As described, gratings may be "reflective" or "transmissive" type, similar to that of a mirror or lens, respectively. A grating may have a "zero-order mode" (where m=0), in which there may be no diffraction and a ray of light behaves according to the laws of reflection and refraction the same as with a mirror or lens, respectively.

An ideal grating may be made up of a set of slits of spacing d, that must be wider than the wavelength of interest to cause diffraction. Assuming a plane wave of monochromatic light of wavelength $\lambda$ with normal incidence (perpendicular to the grating), each slit in the grating may act as a quasi point-source from which light propagates in all directions (although this may be typically limited to a hemisphere). After light interacts with the grating, the diffracted light may be composed of the sum of interfering wave components emanating from each slit in the grating. At any given point in space through which diffracted light may pass, the path length to each slit in the grating may vary. Since path length varies, generally, so may the phases of the waves at that point from each of the slits. Thus, they may add or subtract from each other to create peaks and valleys through additive (constructive) and/or destructive interference. When the path difference between the light from adjacent slits is equal to half the wavelength, $\lambda/2$, the waves may be out of phase, and thus cancel each other to create points of minimum intensity. Similarly, when the path difference is $\lambda$, the phases may add together and maxima occur. The maxima may occur at angles $\theta_m$, which satisfy the relationship:

$$d \sin \theta_m / \lambda = |m|,$$

where $\theta_m$ may represent an angle between the diffracted ray and a grating's normal vector, d may represent a distance from the center of one slit to the center of the adjacent slit, and m may represent an integer representing the propagation-mode of interest.

Thus, when light is normally incident on the grating, the diffracted light may have maxima at angles $\theta_m$, expressed by the following:

$$d \sin \theta_m = m\lambda.$$

If a plane wave is incident at any arbitrary angle $\theta_i$, the grating equation may become:

$$d(\sin \theta_i - \sin \theta_m) = m\lambda.$$

When solved for the diffracted angle maxima, the equation may then be expressed as follows:

$$\theta_m = \arcsin(\sin \theta_i - (m\lambda/d)).$$

It should be appreciated that these equations or expressions may assume that both sides of the grating are in contact with the same medium (e.g., air). Light that corresponds to direct transmission (or specular reflection in the case of a reflection grating) may be called a zero order, and may be denoted m=0. The other maxima may occur at angles represented by non-zero integers m. Note that m may be positive or negative, resulting in diffracted orders on both sides of the zero order beam.

Again, this derivation of the grating equation may be based on an idealized grating element. However, the relationship between angles of the diffracted beams, grating spacing, and/or wavelength of the light may apply to any regular structure of the same spacing because phase relationship between light scattered from adjacent elements of the grating may generally remain the same. The detailed distribution of diffracted light may therefore depend on a detailed structure of the grating element(s) as well as on the number of elements in the grating structure, but it may typically provide maxima in the directions given by the grating equation.

Accordingly, the multi-pass (e.g., four-pass) monochromator-based optical spectrum analyzer (OSA) design provided herein may enable light to be diffracted (e.g., by the same grating element) at least four times as it propagates between an input or entrance slit and an output or exit slit. Since wavelength separation of light is generally proportional to a number of times light interacts with the grating, a high resolution may be obtained with a single relatively small-sized grating. The systems and methods described herein may also provide better management and control of Littrow stray light that can cause adverse effects on optical measurements.

Yet another issue associated with a monochromator-based optical spectrum analyzer (OSA) is that grating efficiency tends to be highly polarization dependent. For maximum grating efficiency, and therefore high optical spectrum analyzer (OSA) dynamic range and low polarization dependent loss (PDL), input polarization generally needs to have a particular orientation with respect to a direction of a grating groove. Thus, the systems and methods described herein may help eliminate of polarization dependent loss (PDL) by separating polarization eigenstates and manipulating those polarization eigenstates to give them that required particular orientation with respect to direction of a grating groove. This may be achieved, for example, using birefringent optics that use angle-separation of the beams. In some examples, this may be achieved in lieu of lateral separation (i.e., walk-off type) and used in conjunction with a depolarizer.

In a compact, high-resolution, grating-based optical spectrum analyzers (OSAs), like system 100 of FIG. 1, it may be helpful to illuminate an entire grating clear aperture. To do this, the diffraction grating 106 of system 100 may be configured with a high incidence angle that is greater than a Littrow angle. Such a configuration may make diffraction efficiency more highly polarization dependent, for example, by favoring diffraction along an s-polarization. It should be appreciated that diffraction along the s-polarization may be normal to a grating groove direction. As a result, the diffraction efficiency of a p-polarization may be almost zero percent. Such behavior may generally reduce power accuracy as well as dynamic range performance. Such reductions in performance may also limit accuracy of many measurements, such as peak power measurement, optical signal to noise ratio (OSNR), optical amplifier gain/noise figure measurement, etc.

Since polarization dependent loss (PDL) may be problematic in monochromator-based optical spectrum analyzers (OSAs), in order to reduce the polarization dependence of the optical spectrum analyzer (OSA), some grating-based optical spectrum analyzers (OSAs) may employ and use a depolarizer (or depolarization element) before (or in front of) the diffraction grating 106. The depolarizer may generally come in two categories: (1) free space depolarizers (e.g., wedge depolarizers, Lyot depolarizers or patterned micro-retarder arrays); or (2) pigtailed depolarizers.

It should be appreciated that either category of depolarizer—free space or pigtailed—may introduce a 4 to 5 dB insertion loss penalty in the monochromator optical spectrum analyzer (OSA), which may directly impact dynamic range of the optical spectrum analyzer (OSA). Furthermore, most of these depolarizer technologies either work well with broadband sources and are not suitable for narrowband lasers (Lyot depolarizers) or work well in only extremely low wavelength range such as the C-band (1528 nm to 1565 nm). Such limited arrangements or restrictions may be sufficient in optical communication applications developed around a C-band. However, with increasing bandwidth demand and development of 5G technologies and related applications, the traditional C-band may not be ideal. Furthermore, use of these depolarizers in an L-band (e.g., 1565 nm to 1625 nm) of an optical spectrum may become highly overloaded. Optical carriers may already be exploring other wavelength bands, such as O-band (1260 nm to 1360 nm), E-band (1360 nm to 1460 nm), and/or S-band (1460 nm to 1530 nm), but conventional depolarizers, however, are simply not suitable for such wide wavelength ranges. Moreover, patterned micro-retarder arrays may also alter optical beam quality through micro beam diffusion and may not be suitable in fiber coupling scenarios.

Figure 2:
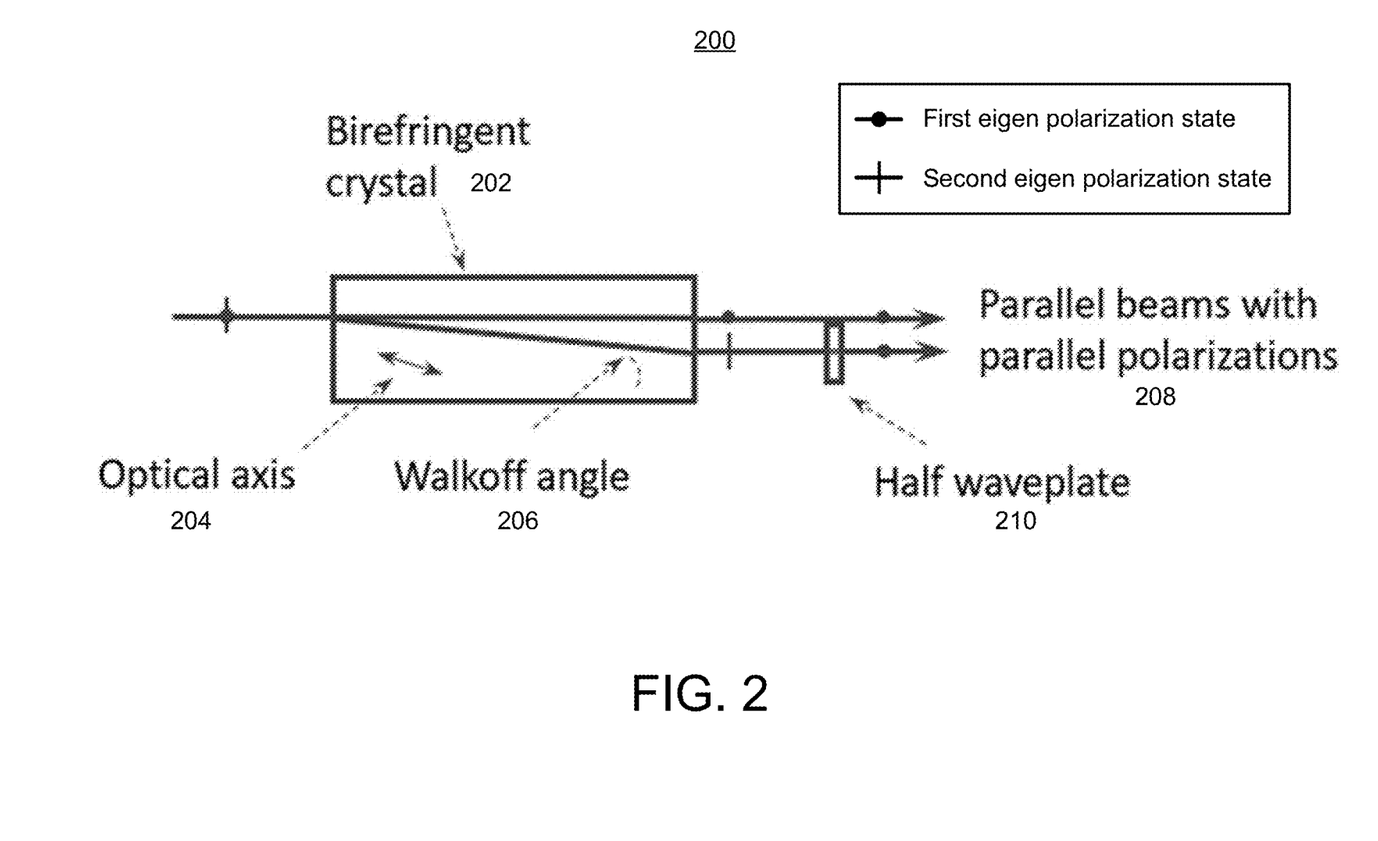
FIG. 2 illustrates a configuration 200 using a birefringent element and optics in a high resolution optical spectrum analyzer (OSA), according to an example.

FIG. 2 illustrates a configuration 200 using a birefringent element and optics in a high resolution optical spectrum analyzer (OSA), according to an example. To reduce grating efficiency polarization dependence over a wide wavelength range, it may be helpful to split input polarization state into two eigen polarization states, and to use at least one half wave plate in an arrangement that makes two eigenstates parallel before they strike a diffraction grating, e.g., grating element 106 of system 100. Referring to configuration 200 of FIG. 2, one way to split an input polarization into two eigenstates may involve using a birefringent element 202 (e.g., birefringent crystal) that is cut in such a way that the two eigenstates propagate through the birefringent element (at an optical axis 204) with a walk-off angle 206. At the exit of the birefringent element 202, the separated eigen polarization state beams may propagate in parallel 208. A half wave plate (or a set of half wave plates) 210 may be used to transform the respective polarization states (shown by the dot and hash to illustrate two different states) of the two separate eigen polarization state beams to an s-polarization (e.g., denoted by the dot) at the diffraction grating (not shown).

It should be appreciated that in order to spatially separate the two polarization eigenstates so that a half wave plate 210 can be inserted in their respective optical paths, the birefringent element 202 may generally need to have a minimum length and aperture due to a relatively small walk-off angle 206. When an optical beam becomes too large, however, this approach may become unreasonable and impractical, as it may require relatively bulky and costly birefringent crystals and/or wave plates, similar to the problem encountered in double-pass monochromator-based optical spectrum analyzers (OSAs) requiring larger and bulkier diffraction gratings to obtain higher resolutions. The systems and methods described herein may provide a number of various configurations to resolve these issues.

For example, a birefringent prism that splits an input polarization state into two eigen polarization states, one of which, at least, is angularly split from the other, may help to resolve some of these issues. The angular splitting of one beam may be referred to as semi-angular splitting, whereas the angular splitting of both beams may be referred to as angular splitting. Either arrangement may allow for larger beam separation using a relatively smaller birefringent element or crystal. The angularly separated beam may then be made parallel to the other by means of one or more optical arrangements comprising any number of reverse birefringent prisms or mirrors.

FIG. 3A-3F illustrate configurations 300A-300F using various angular beam separation and optics to achieve parallel eigenstates before reaching a diffraction grating in a higher resolution optical spectrum analyzer (OSA), according to an example. As shown in configuration 300A of FIG. 3A, an optical beam may be split using a birefringent element, such as a Rochon prism 302a. The Rochon prism 302a may have first optical axis 304a-1 and a second optical axis 304a-2. The birefringent element 202 may split the beam into two non-parallel beams having different polarizations. Accordingly, the configuration 300A may use an optical configuration comprising, for example, a glass prism 312 and a half wave plate 310 to correct one of the exit beams so that both beams may be parallel beams with parallel polarizations 308. At this point, the parallel beams with parallel polarizations 308 may be transmitted downstream along its optical path, e.g., to a grating element 106 of the OSA.

Figure 3A:
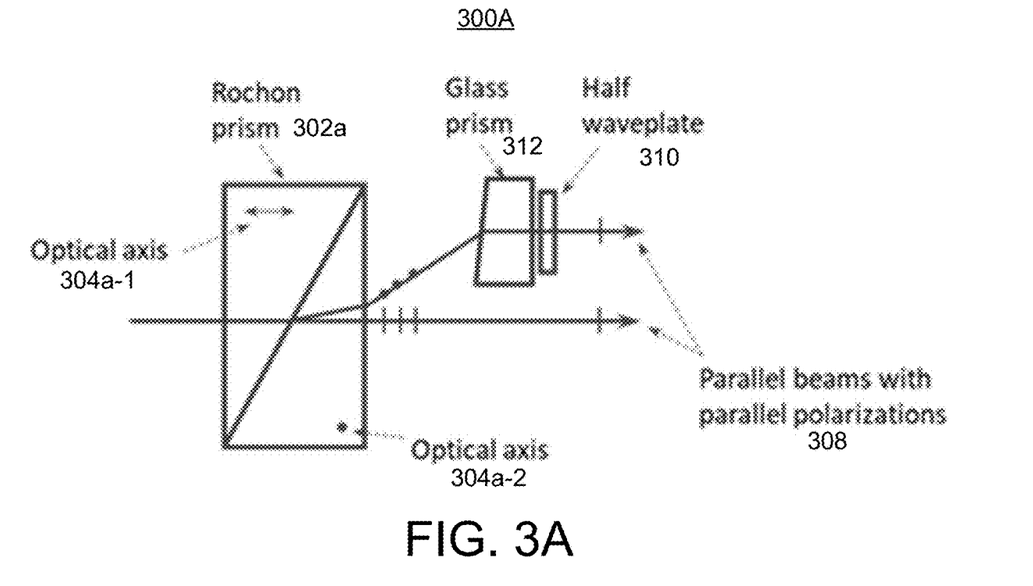
FIGS. 3A-3F illustrate configurations 300A-300F using various angular beam separation and optics to achieve parallel eigenstates before reaching a diffraction grating in a high resolution optical spectrum analyzer (OSA), according to an example.

It should be appreciated that the Rochon prism 302a may be a type of polarizer made from two prisms of birefringent material, such as calcite, which may then be adhered together using an adhesive, such as cement or epoxy. The Rochon prism 302a, as used herein, may allow one optical beam to pass through the prism 302a undeviated.

Figure 3B:
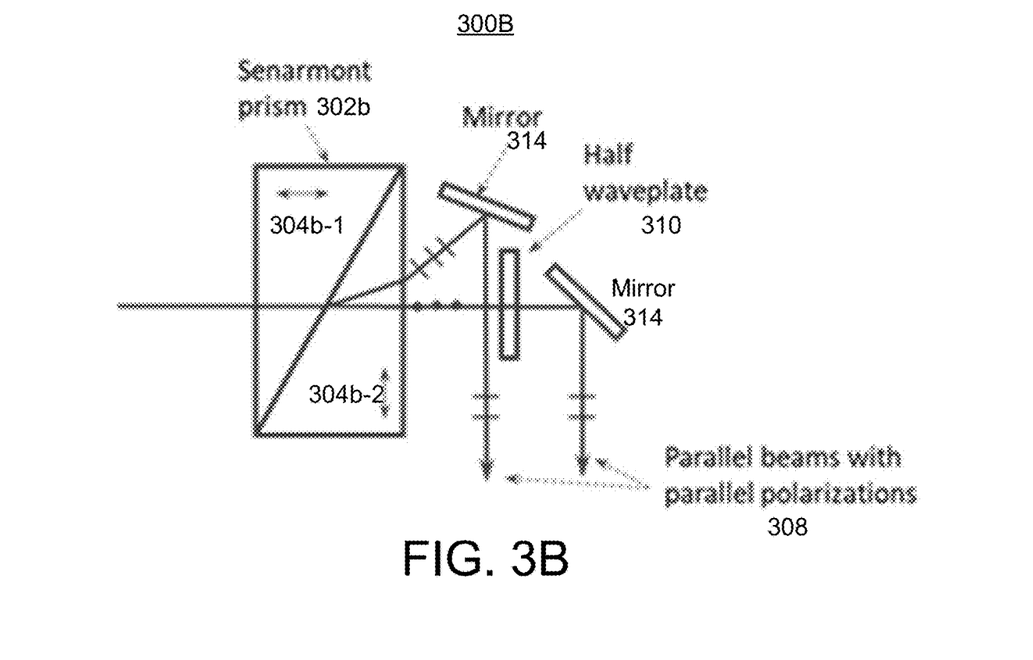

Similar to configuration 300A of FIG. 3A, configuration 300B of FIG. 3B may include an optical beam may be split using a birefringent element, such as a Sénarmont prism 302b. The Sénarmont prism 302b may have first optical axis 304b-1 and a second optical axis 304b-2. The birefringent element may split the beam into two non-parallel beams having different polarizations. Accordingly, the configuration 300B may use an optical configuration comprising, for example, a two mirrors 314 to correct the direction of the two beams, and a half wave plate 310 to correct the polarization state of one of the exit beams so that both beams may be parallel beams with parallel polarizations 308, as shown, before being transmitted downstream.

It should be appreciated that the Sénarmont prism 302b may be a type of polarizer made from two prisms of birefringent material, such as calcite, which may then be adhered together using an adhesive, such as cement or epoxy. Similar in construction to and action of the Rochon prism 302a, the Sénarmont prism 302b may allow one optical beam to pass through the prism undeviated. However, the s-polarized ray (i.e., the ray with polarization direction perpendicular to the plane in which all rays are contained, called the plane of incidence) passes through without being deflected, while the p-polarized ray (with polarization direction in the plane of incidence) may be deflected (or refracted) at the internal interface into a different direction. In the Rochon prism 302a, it is the p-polarized ray that may remain an o-ray on both sides of an interface and is therefore not deflected/refracted, while the s-polarized ray may change from o-ray to e-ray and is therefore deflected/refracted.

Figure 3C:
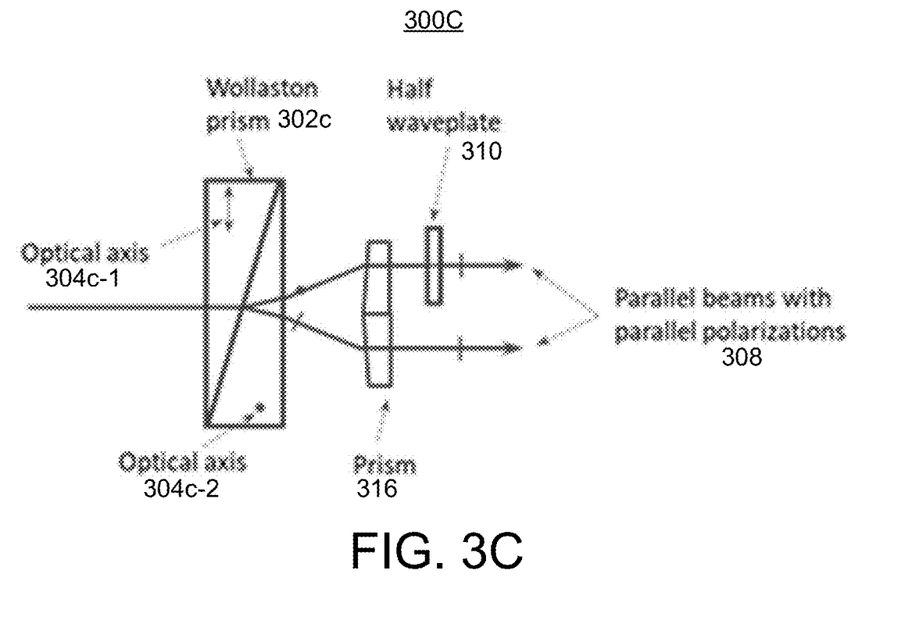

In configuration 300C of FIG. 3C, an optical beam may be split using a birefringent element, such as a Wollaston prism 302c. The Wollaston prism 302c may have first optical axis 304c-1 and a second optical axis 304c-2. The birefringent element may split the beam into two non-parallel beams having different polarizations. The configuration 300C using the Wollaston prism 302c may use an optical configuration comprising, for example, a prism 316 to correct the direction of the two beams, and a half wave plate 310 to correct one of the exit beams so that both beams may be parallel beams with parallel polarizations 308. In some examples, a second Wollaston prism may be used, as shown in configuration 300D of FIG. 3D.

Figure 3D:
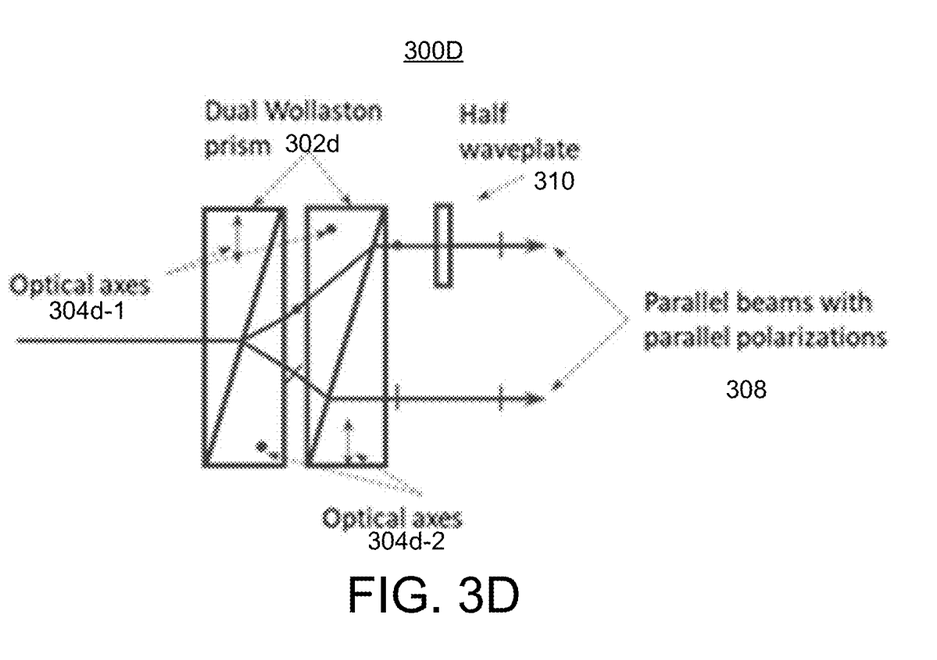

In this configuration 300D, a dual Wollaston prism 302d may be provided, where each Wollaston prism may have a first optical axis 304d-1 and a second optical axis 304d-2. The dual Wollaston prism 302d may be used as the birefringent element to split the incoming beam. This configuration 300D may not need a prism 316, like that shown in configuration 300C, since the second Wollaston prism of configuration 300D may achieve the same effect of correcting the exist beams so that they are parallel with each other. That said, a half wave plate 310 may still be used, as shown, to correct/adjust the polarization to one of the exit beams so that both beams may be parallel beams and have parallel polarizations 308 before entering the downstream grating element (not shown).

It should be appreciated that the Wollaston prism 302c (in the single or dual configuration) may be a type of optical device that manipulates polarized light. The Wollaston prism 302c may separate light into two separate linearly polarized outgoing beams with orthogonal polarization. The two beams may be polarized according to the optical axes 304c-1 and 304o-2 of the two right angle prisms. In effect the Wollaston prism 302c may consist of two orthogonal prisms of birefringent material, such as calcite, which is similar in construction to and action of the Rochon prism 302a or the Sénarmont prism 302b.

Figure 3E:
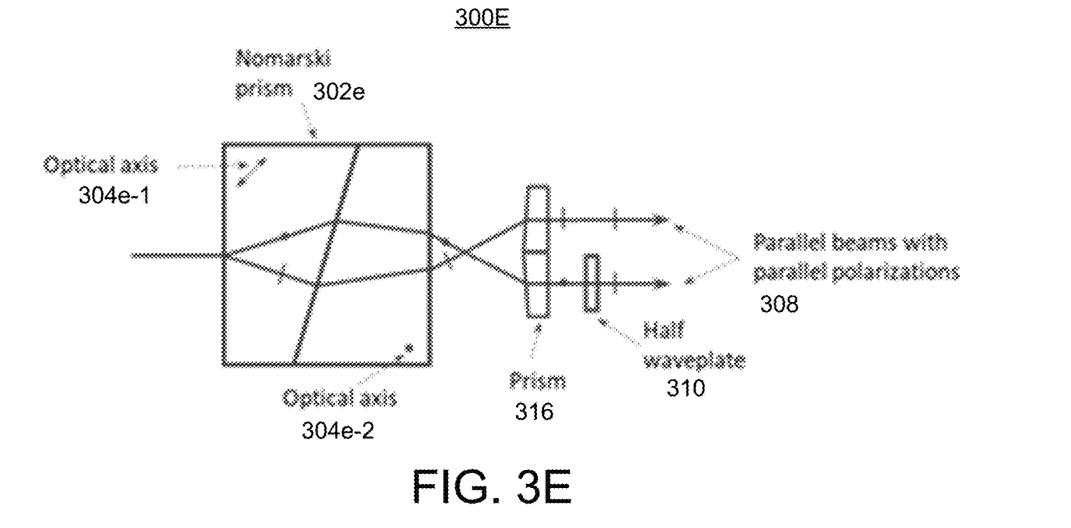

As shown in configuration 300E of FIG. 3E, an optical beam may be split using a birefringent element, such as a Nomarski prism 302e. The Nomarski prism 302e may also have first optical axis 304e-1 and a second optical axis 304e-2. The birefringent element may split the beam into two non-parallel beams having different polarizations. The configuration 300E using the Nomarski prism 302e may also use an optical configuration comprising, for example, a prism 316 to correct the direction of the two beams, and a half wave plate 310 to correct one of the exit beams so that both beams may be parallel beams with parallel polarizations 308, similar to that shown in configuration 300C using the Wollaston prism 302c.

It should be appreciated that the Nomarski prism 302e may be a modification or variation of the Wollaston prism 302c, and may be typically used in differential interference contrast microscopy scenarios. That said, like the Wollaston prism 302c, the Nomarski prism 302e may consist of two birefringent crystal wedges (e.g., quartz or calcite) cemented together at the hypotenuse (e.g., with Canada balsam). One of the wedges may be identical (or close to identical) to a conventional Wollaston wedge and has an optical axis oriented parallel to the surface of the prism. The second wedge of the Nomarski prism 302e, however, may be modified by cutting the crystal so that the optical axis, for example, is oriented obliquely with respect to the flat surface of the prism. The Nomarski modification may cause light rays to come to a focal point outside the body of the prism, and allows greater flexibility in various optical applications.

Figure 3F:
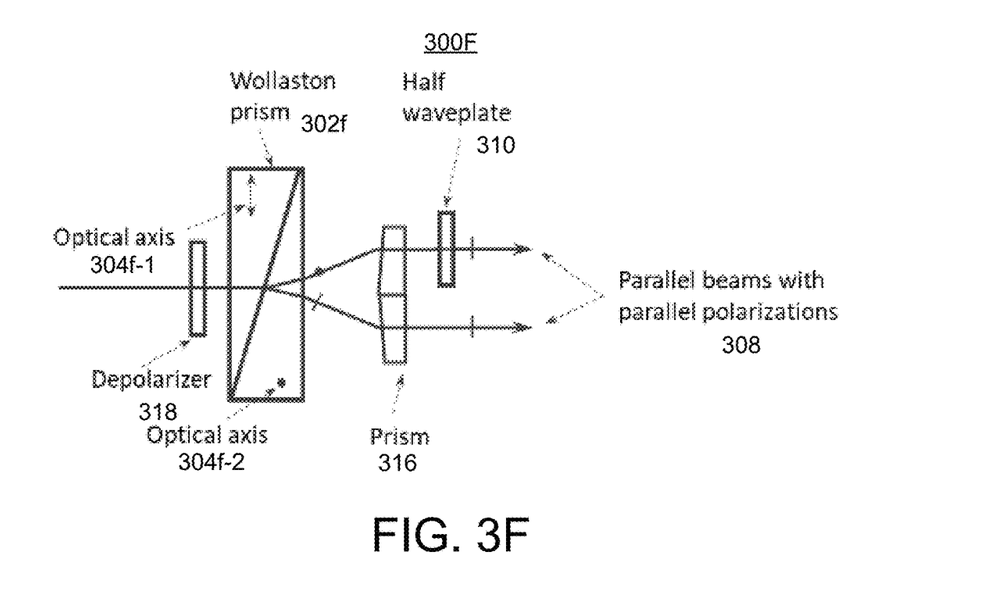

It should be appreciated that the polarization splitting alone, as described herein and elsewhere may not be sufficient to eliminate or reduce polarization to levels below 0.1 dB. The reason for this may be due to tolerances related to birefringent elements used in any number of arrangements or configurations. Another reason for this may be due to insertion loss (IL) difference along any individual polarization path. The polarization dependent loss (PDL) impact may be mainly attributed to optical flux imbalance between the two polarization paths which may typically vary from 0% to 100% (relative extinction ratio between the two polarization paths). Accordingly, introducing a polarization scrambling (passive or active) element before polarization splitting may allow for a more even distribution of optical power between the polarization paths, even regardless of input polarization state. As a result of polarization scrambling provided by a polarization scrambling element, power in both split paths may be balanced and generally maintained regardless of input polarization state. Here, insertion loss (IL) accumulated along individual polarization paths also may not contribute to polarization dependent loss (PDL). FIG. 3F illustrates a configuration 300F using a polarization scrambling element. Configuration 300F of FIG. 3F is similar to configuration 300C of FIG. 3C, but as shown, a polarization scrambling element, such as a glass depolarizer 318, may be provided before the birefringent element, such as a Wollaston prism 302f. Here, the glass depolarizer 318 may power in both split paths may be balanced and maintained regardless of input polarization state, and any insertion loss (IL) accumulated may not exacerbate polarization dependent loss (PDL) levels. Although the polarization scrambling element is shown in a configuration with a Wollaston prism, it should be appreciated that the polarization scrambling element may also be used for any of the other prisms or birefringent elements described herein or elsewhere.

Some advantages and benefits of the systems and methods are readily apparent. For example, the systems and methods using one or more of the configurations described herein may allow for a large, user-defined polarization path separation using relatively small optical parts. Use of smaller parts may make it possible to provide for small and relatively large optical beams. Using a conventional or standard walk-off crystal approach, especially in the case of large diameter beams, may not achieve the desired higher resolution in optical spectrum analyzers. Furthermore, use of a polarization scrambling (i.e., for depolarization) for active or passive polarization scrambling before polarization splitting may provide a more even distribution of optical power between the two split paths regardless of the input polarization and therefore reduces the PDL to levels below 0.01 dB over a broadband wavelength range.

Figure 4:
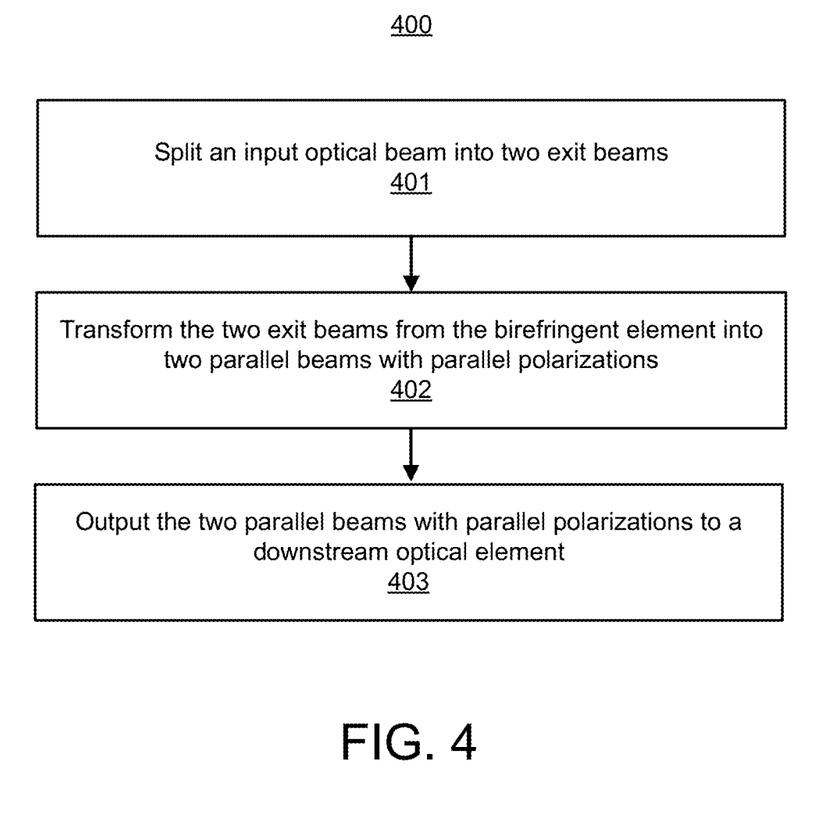
FIG. 4 illustrates a flow chart of a method for reducing polarization dependent loss (PDL) in an optical spectrum analyzer (OSA) system, according to an example.

FIG. 4 illustrates a flow chart of a method for reducing polarization dependent loss (PDL) in an optical spectrum analyzer (OSA) system, according to an example. The method 400 is provided by way of example, as there may be a variety of ways to carry out the method described herein. Although the method 400 is primarily described as being performed by the system 100 of FIG. 1, the method 400 may be executed or otherwise performed by one or more processing components of another system or a combination of systems. Each block shown in FIG. 4 may further represent one or more processes, methods, or subroutines, and one or more of the blocks may include machine readable instructions stored on a non-transitory computer readable medium and executed by a processor or other type of processing circuit to perform one or more operations described herein.

At block 401, an optical beam, received at the birefringent element 202 of configuration 200 or 302a-302e of configurations 300A-300F of system 100, may be split into two exit beams. In some examples, the birefringent element may be a birefringent crystal, as described above. In some examples, the birefringent element may include at least one of a Rochon prism, a Sénarmont prism, a Wollaston prism, a Nomarski prism, or a combination thereof, or other birefringent element.

At block 402, the optical configuration of configurations 300A-300F may transform the two exit beams from the birefringent element into two parallel beams with parallel polarizations. This may be achieved using at least one optical element in the optical configuration. In some examples, the at least one optical element in the optical configuration may be any number of prisms, mirrors, or half wave plates, which may be configured to reduce polarization dependent loss (PDL).

At block 403, the optical configuration of configurations 300A-300F may output the two parallel beams with parallel polarizations to a downstream optical element. In some examples, the downstream optical element may be a diffraction grating or other optical element in an optical system, such as an optical spectrum analyzer (OSA).

It should be appreciated that a polarization scrambling element may also be provided to minimize effects of insertion loss (IL) and enhance reduction of polarization dependent loss (PDL) for higher resolution optical measurements. In some examples, the polarization scrambling element may include any number of active depolarizers, passive depolarizers, or glass depolarizers, or combination thereof.

Although described with respect to the 4-pass configuration of system 100, it should be appreciated that the systems and methods described herein may be used in at least one of a single-pass optical spectrum analyzer (OSA), multi-pass optical spectrum analyzer (OSA), narrow (or ultra-narrow) band tunable filter, an extended cavity diode laser, and/or other optical system.

As mentioned above, there may be numerous ways to configure or position the various optical elements of the system 100, such as the grating element 106, the retroreflective element 108, and/or the mirror 110, or other optical elements of configurations 300A-300F. Although these may be adjusted to reduce or eliminate polarization dependent loss (PDL), as described herein, adjusting these and other components may also provide a more efficient or compact design for the optical path of the optical beam 104. In this way, other electrical, thermal, mechanical and/or design advantages may also be obtained.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

It should be appreciated that the systems and methods described herein may minimize, reduce, and/or eliminate insertion loss (IL) or polarization dependent loss (PDL), and thereby facilitate more reliable and accurate optical measurements. It should also be appreciated that the systems and methods, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. For example, although one prism (or other element) may be shown in an optical configuration, two more prisms (or optical elements) may also be provided to achieve a similar result. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to test and measurement systems, such as optical spectrum analyzers (OSAs), it should be appreciated that the systems and methods described herein may also be used in other various systems and other implementations. For example, these may include an ultra-narrow band tunable filter, an extended cavity diode laser, and/or applied stages to further increase the spectral resolution of various test and measurement systems. In fact, there may be numerous applications in optical communication networks and fiber sensor systems that could employ the systems and methods as well.

It should be appreciated that the systems and methods described herein may also be used to help provide, directly or indirectly, measurements for distance, angle, rotation, speed, position, wavelength, transmissivity, and/or other related optical measurements. For example, the systems and methods described herein may allow for a high resolution (e.g., picometer-level) optical resolution using an efficient and cost-effective design concept that also facilitates the reduction or elimination of insertion loss (IL) and/or polarization dependent loss (PDL), or other adverse effects, such as Littrow stray light.

With additional advantages that include high resolution, low number of optical elements, efficient cost, and small form factor, the systems and methods described herein may be beneficial in many original equipment manufacturer (OEM) applications, where they may be readily integrated into various and existing network equipment, fiber sensor systems, test and measurement instruments, or other systems and methods. The systems and methods described herein may provide mechanical simplicity and adaptability to small or large optical measurement devices. Ultimately, the systems and methods described herein may increase resolution, minimize or better manage adverse polarization dependent loss (PDL), and improve measurement efficiencies.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A multi-pass optical spectrum analyzer (OSA), comprising:
an optical configuration comprising:
a birefringent element to receive and split an input optical beam into two exit beams, the birefringent element comprising:
a first birefringent wedge having a first optical axis and comprising a hypotenuse surface; and
a second birefringent wedge having a second optical axis and comprising a hypotenuse surface,
wherein the hypotenuse surface of the first birefringent wedge is cemented to the hypotenuse surface of the second birefringent wedge such that the first optical axis is not parallel to the second optical axis, and
wherein the input optical beam traverses the first birefringent wedge, the cemented hypotenuse surfaces of the first birefringent wedge and the second birefringent wedge, and the second birefringent wedge, to become the two exit beams, the two exit beams comprising:
a first exit beam having a first polarization state and a first direction; and
a second exit beam having a second polarization state different from the first polarization state and a second direction diverging from the first direction; and
optics to receive and to transform at least one of the first exit beam and the second exit beam such that the two exit beams are parallel and have the same polarization state;
a grating element to receive and diffract the two parallel exit beams having the same polarizations, and to output diffracted beams therefrom; and
a retroreflective element to receive the output diffracted beams and reflect back the diffracted beams to the grating element such that the input optical beam passes through the grating element multiple times.

2. The multi-pass OSA of claim 1, wherein the multi-pass OSA is monochromator-based.

3. The multi-pass OSA of claim 1, wherein the birefringent element is to separate polarization eigenstates of the optical beam such that the two exit beams have different polarization eigenstates.

4. The multi-pass OSA of claim 1, wherein the birefringent element is to angularly separate the optical beam such that the two exit beams are angularly-separated.

5. The multi-pass OSA of claim 1, wherein the optical configuration further comprises:
a polarization scrambling element to provide the input optical beam to the birefringent element by:
receiving the input optical beam;
scrambling a polarization of the input optical beam; and
outputting the polarization scrambled optical beam to the birefringent element.

6. The multi-pass OSA of claim 5, wherein the polarization scrambling element is to minimize effects of insertion loss (IL) and enhance reduction of polarization dependent loss (PDL) for higher resolution optical measurements.

7. The multi-pass OSA of claim 5, wherein the polarization scrambling element comprises at least one depolarizer.

8. The multi-pass OSA of claim 7, wherein the at least one depolarizer comprises at least one of an active depolarizer, a passive depolarizer, or a glass depolarizer.

9. The multi-pass OSA of claim 1, wherein the birefringent element comprises a Rochon prism.

10. The multi-pass OSA of claim 1, wherein the birefringent element comprises a Sénarmont prism.

11. The multi-pass OSA of claim 1, wherein the birefringent element comprises a Wollaston prism.

12. The multi-pass OSA of claim 1, wherein the birefringent element comprises:
a first Wollaston prism comprising the first birefringent wedge and the second birefringent wedge; and
a second Wollaston prism.

13. The multi-pass OSA of claim 1, wherein the birefringent element comprises a Nomarski prism.

14. The multi-pass OSA of claim 1, wherein the first birefringent wedge and the second birefringent wedge are disposed in relation to each other such that the first optical axis is perpendicular to the second optical axis.

15. The multi-pass OSA of claim 1, wherein the first birefringent wedge and the second birefringent wedge are cemented together using at least one of epoxy or cement.

16. The multi-pass OSA of claim 1, wherein the optics of the optical configuration comprise:
a half wave plate to transform the first exit beam such that the two exit beams both have the same polarization state.

17. The multi-pass OSA of claim 1, wherein the optics of the optical configuration are to modify a direction of at least one of the first and second exit beams such that the two exit beams are parallel and have the same polarization state.

18. The multi-pass OSA of claim 1, wherein the optics of the optical configuration comprise:
at least one of a mirror or a prism to modify a direction of at least one of the first and second exit beams such that the two exit beams are parallel and have the same polarization state.

19. The multi-pass OSA of claim 1, wherein the retroreflective element comprises:
at least one of a mirror, a lens, or a prism reflector.

20. A multi-pass optical spectrum analyzer (OSA), comprising:
an optical configuration comprising:
a polarization scrambling element to receive and scramble an input optical beam, and to output a polarization scrambled input beam;
a birefringent element to receive the polarization scrambled input beam and split the polarization scrambled input beam into two exit beams, the birefringent element comprising:
a first birefringent wedge having a first optical axis and comprising a hypotenuse surface; and
a second birefringent wedge having a second optical axis and comprising a hypotenuse surface,
wherein the hypotenuse surface of the first birefringent wedge is attached to the hypotenuse surface of the second birefringent wedge such that the first optical axis is not parallel to the second optical axis, and wherein the input optical beam traverses the first birefringent wedge, the cemented hypotenuse surfaces of the first birefringent wedge and the second birefringent wedge, and the second birefringent wedge, to become the two exit beams, the two exit beams comprising:

a first exit beam having a first polarization state and a first direction; and a second exit beam having a second polarization state different from the first polarization state and a second direction diverging from the first direction; and optics to receive and to transform at least one of the first exit beam and the second exit beam such that the two exit beams are parallel and have the same polarization state;

a grating element to receive and diffract the two parallel exit beams having the same polarizations, and to output diffracted beams therefrom; and a retroreflective element to receive the output diffracted beams and reflect back the diffracted beams to the grating element such that the input optical beam passes through the grating element two or more times.

* * * * *